(12) United States Patent
Singh et al.

(10) Patent No.: US 12,271,628 B2
(45) Date of Patent: Apr. 8, 2025

(54) NON-VOLATILE MEMORY-BASED STORAGE DEVICE, DEVICE CONTROLLER AND METHOD THEREOF

(71) Applicant: SAMSUNG ELECTRONICS CO., LTD., Suwon-si (KR)

(72) Inventors: Rajendra Singh, Suwon-si (KR); Jaewon Song, Suwon-si (KR); Jaesub Kim, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 37 days.

(21) Appl. No.: 17/983,458

(22) Filed: Nov. 9, 2022

(65) Prior Publication Data

US 2023/0359392 A1    Nov. 9, 2023

(30) Foreign Application Priority Data

Nov. 25, 2021   (KR) .................. 10-2021-0164973
May 3, 2022     (KR) .................. 10-2022-0054905

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 6,457,097 B1 *   9/2002   Tamura ................... G06F 3/064
                                                           711/113
6,877,070 B2 *   4/2005   Espeseth ............... G06F 3/0656
                                                           711/111
(Continued)

FOREIGN PATENT DOCUMENTS

JP    2012234363 A    11/2012
JP    2012234369 A    11/2012
(Continued)

OTHER PUBLICATIONS

A. Modgil et al., "Improving the Performance of Chip Multiprocessor by Delayed Write Drain and Prefetcher based Memory Scheduler," 2018 Second International Conference on Electronics, Communication and Aerospace Technology (ICECA), 2018, pp. 1864-1869, doi: 10.1109/ICECA.2018.8474846 (Year: 2018).*
(Continued)

*Primary Examiner* — Daniel C. Chappell
(74) *Attorney, Agent, or Firm* — Fish & Richardson P.C.

(57) ABSTRACT

A device controller of a storage device including a non-volatile memory peeks a command from a submission queue, and determines whether the peeked command is executable based on a status of device resources. In response to determining that the command is executable, the device controller fetches the command, allocates the device resources to the fetched command, and executes the command.

17 Claims, 14 Drawing Sheets

(58) Field of Classification Search
CPC ....... G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 8,601,169 B1* | 12/2013 | Paragaonkar | G06F 3/0659 |
| | | | 710/52 |
| 8,732,393 B2* | 5/2014 | Iwasaki | G06F 3/0659 |
| | | | 711/111 |
| 8,874,836 B1* | 10/2014 | Hayes | G06F 3/0608 |
| | | | 711/151 |
| 8,966,164 B1* | 2/2015 | Asnaashari | G06F 3/0688 |
| | | | 711/103 |
| 8,977,833 B2 | 3/2015 | Kazui et al. | |
| 9,715,465 B2 | 7/2017 | Conner et al. | |
| 9,760,281 B2 | 9/2017 | Ramalingam | |
| 10,019,161 B2* | 7/2018 | Sharifie | G06F 3/0629 |
| 10,310,810 B2 | 6/2019 | Fukuchi | |
| 10,346,052 B2 | 7/2019 | Ji et al. | |
| 10,353,587 B2* | 7/2019 | Jeong | G06F 3/0659 |
| 10,509,569 B2 | 12/2019 | Richter et al. | |
| 10,866,740 B2* | 12/2020 | Benisty | G06F 12/0246 |
| 2014/0351511 A1* | 11/2014 | Cheng | G06F 3/0611 |
| | | | 711/114 |
| 2016/0117119 A1* | 4/2016 | Kim | G06F 13/1642 |
| | | | 711/103 |
| 2016/0283116 A1* | 9/2016 | Ramalingam | G06F 3/0602 |
| 2017/0060422 A1* | 3/2017 | Sharifie | G06F 3/0659 |
| 2018/0188975 A1* | 7/2018 | Benisty | G06F 3/0679 |
| 2018/0275872 A1* | 9/2018 | Benisty | G06F 13/24 |
| 2018/0285073 A1* | 10/2018 | Fukuchi | G06F 5/10 |
| 2018/0314421 A1* | 11/2018 | Linkovsky | G06F 3/0679 |
| 2018/0321844 A1* | 11/2018 | Benisty | G06F 13/1642 |
| 2018/0321945 A1* | 11/2018 | Benisty | G06F 13/00 |
| 2018/0341410 A1* | 11/2018 | Benisty | G06F 3/0659 |
| 2018/0349026 A1* | 12/2018 | Richter | G06F 13/1642 |
| 2019/0018805 A1* | 1/2019 | Benisty | G06F 13/1642 |
| 2019/0035445 A1 | 1/2019 | Huang | |
| 2019/0278523 A1* | 9/2019 | Benisty | G06F 3/0658 |

FOREIGN PATENT DOCUMENTS

| | | |
|---|---|---|
| JP | 20170130376 A | 11/2017 |
| JP | 201816981 A | 11/2018 |
| JP | 2018169810 A | 11/2018 |
| KR | 20140061018 A | 5/2014 |
| KR | 20160050139 A | 5/2016 |
| KR | 20180126656 A | 11/2018 |
| WO | WO2018/175064 A1 | 9/2018 |

OTHER PUBLICATIONS

M. Kallahalla and P. J. Varman, "PC-OPT: optimal offline prefetching and caching for parallel I/O systems," in IEEE Transactions on Computers, vol. 51, No. 11, pp. 1333-1344, Nov. 2002, doi: 10.1109/TC.2002.1047757. (Year: 2002).*

L. Wu, M. Kim and S. Edwards, "Cache Impacts of Datatype Acceleration," in IEEE Computer Architecture Letters, vol. 11, No. 1, pp. 21-24, Jan.-Jun. 2012, doi: 10.1109/L-CA.2011.25. (Year: 2012).*

A. Naithani, J. Feliu, A. Adileh and L. Eeckhout, "Precise Runahead Execution," 2020 IEEE International Symposium on High Performance Computer Architecture (HPCA), San Diego, CA, USA, 2020, pp. 397-410, doi: 10.1109/HPCA47549.2020.00040. (Year: 2020).*

Korean Office Action dated Jan. 13, 2023, Cited in Corresponding Korean Patent Application No. 10-2022-0054905.

European Search Report Dated Apr. 14, 2023, Cited in Corresponding Ep Patent Application No. 22206564.1.

* cited by examiner

NON-VOLATILE MEMORY-BASED STORAGE DEVICE, DEVICE CONTROLLER AND METHOD THEREOF

CROSS-REFERENCE TO RELATED APPLICATION

This application claims priority under 35 U.S.C. 119 to Korean Patent Application No. 10-2021-0164973 filed in the Korean Intellectual Property Office on Nov. 25, 2021, and priority to Korean Patent Application No. 10-2022-0054905 filed in the Korean Intellectual Property Office on May 3, 2022, the entire contents of which are incorporated herein by reference.

BACKGROUND

(a) Field

The present disclosure relates to a non-volatile memory-based storage device, a device controller, and a method thereof.

(b) Description of the Related Art

Read resources and write resources may exist separately in a resource pool of a non-volatile memory-based storage device such as a solid-state drive (SSD). Each of the read resources and the write resources may be used to process a specific type of input/output (I/O). The resource pool may also include shared resources shared by all types of I/O.

Once the shared resources are used up, the storage device may temporarily stop processing all I/O types of commands until the shared resource is available again. In particular, if the storage device fetches a large number of write commands, almost all of the shared resources may be occupied by the write commands. In general, it takes longer to process the write commands, so the shared resources may be occupied longer. Accordingly, although a read command can use the read resources, the storage device may not process the read command because all shared resources are exhausted. Further, if the storage device brings a write command when the write resources are exhausted, the storage device may block the shared resources until the write resources are available. Then, even if the storage device brings the read command, it may not process the read command. In this way, other commands may be on hold due to exhaustion of some resources, and the waiting commands may cause a bottleneck in a command processing pipeline, so that command processing efficiency may decrease due to an increase in the latency of the that command.

SUMMARY

Some embodiments may provide a non-volatile memory-based storage device, a device controller, and a method for increasing command processing efficiency.

According to some embodiments, a device controller of a storage device including a non-volatile memory may be provided. The device controller may include device resources, a command fetch logic, a command preprocessing logic, and a command processing logic. The command fetch logic may peek a first command from a first submission queue from among a plurality of submission queues, and fetch the first command in response to determining that the first command is executable. The command preprocessing logic may determine whether the first command peeked by the command fetch logic is executable based on a status of the device resources. In response to determining that the first command is executable, the command processing logic may allocate the device resources to the first command fetched by the command fetch logic and execute the first command.

In some embodiments, the command fetch logic may not move a head pointer of the first submission queue at a time of peeking the first command, and move the head pointer of the first submission queue to fetch the first command.

In some embodiments, the command fetch logic may peek a second command from a second submission queue among the plurality of submission queues. The command preprocessing logic may determine whether the second command is executable based on the status of the device resources, and mark the second submission queue as a waiting state of waiting for the device resources in response to determining that the second command is inexecutable.

In some embodiments, the command fetch logic may drop the second command without fetching the second command in response to determining that the second command is inexecutable.

In some embodiments, the command preprocessing logic may determine whether the second submission queue marked as the waiting state is processable based on the status of the device resource. In response to determining that the second submission queue is processable, the command fetch logic may peek the second command from the second submission queue, and the command preprocessing logic may determine whether the second command is executable.

In some embodiments, the command preprocessing logic may determine that the second submission queue is processable when a resource for which the second command waits among the device resources is available.

In some embodiments, the command preprocessing logic may prioritize the second submission queue marked as the waiting state over remaining submission queues among the plurality of submission queues.

In some embodiments, the device controller may further include a pending command queue. The command fetch logic may peek the first command and a second command from the first submission queue. In response to the command preprocessing logic determining that the first command is executable and the second command is inexecutable, the command fetch logic may fetch the first command and the second command, and the command preprocessing logic may store the second command in the pending command queue.

In some embodiments, the command preprocessing logic may determine whether a third command stored in the pending command queue is executable based on the status of the device resources. In response to determining that the third command in the pending command queue is executable, the command processing logic may execute the third command in the pending command queue.

In some embodiments, the command preprocessing logic may prioritize the pending command queue over the plurality of submission queues.

In some embodiments, the command fetch logic may peek the first command and a second command from the first submission queue. In response to the command preprocessing logic determining that the first command is executable and the second command is inexecutable, the command fetch logic may fetch the first command from the first submission queue and pack the second command in the first submission queue.

In some embodiments, the command fetch logic may move a head pointer of the first submission queue by the number of the first command, and pack the second command from an entry to which the head pointer is moved.

In some embodiments, the command preprocessing logic may determine whether the first submission queue packed by the command fetch logic is processable based on the status of the device resources. In response to determining that the first submission queue is processable, the command fetch logic may peek the second command from the first submission queue, and the command preprocessing logic may determine whether the second command is executable.

In some embodiments, the command preprocessing logic may prioritize the first submission queue over remaining submission queues among the plurality of submission queues.

In some embodiments, the command preprocessing logic may determine that the first command is executable and fetch the first command when a resource for executing the first command among the device resources is available.

In some embodiments, the device resources may include read resources dedicated to a read command, write resources dedicated to a write command, and shared resources shared by the read command and the write command. The command preprocessing logic may determine that a resource for executing the first command is available and may fetch the first command when a resource corresponding to an input/output type of the first command among the read resources and the write resources, and the shared resource are available.

In some embodiments, the device resources may include a plurality of types of resources used to execute the first command. The command preprocessing logic may determine that the resource for executing the first command is unavailable when at least a portion among the plurality of types of resources is unavailable.

In some embodiments, the command preprocessing logic may not allocate the device resources to the first command when the resource for executing the first command among the device resources is unavailable.

According to some embodiments, a storage device including a non-volatile memory and a device controller may be provided. The device controller may control an access to the non-volatile memory, bring a command from a submission queue without moving a head pointer of the submission queue, determine whether the command is executable based on a status of device resources, and move the head pointer of the submission queue in response to determining that the command is executable.

According to some embodiments, a method executed by a storage device including a non-volatile memory may be provided. The method may include peeking a command from a submission queue, determining whether the command is executable based on a status of device resources, fetching the command in response to determining that the command is executable, and allocating device resources to the command and executing the command in response to determining that the command is executable.

DETAILED DESCRIPTION OF THE EMBODIMENTS

Figure 1:
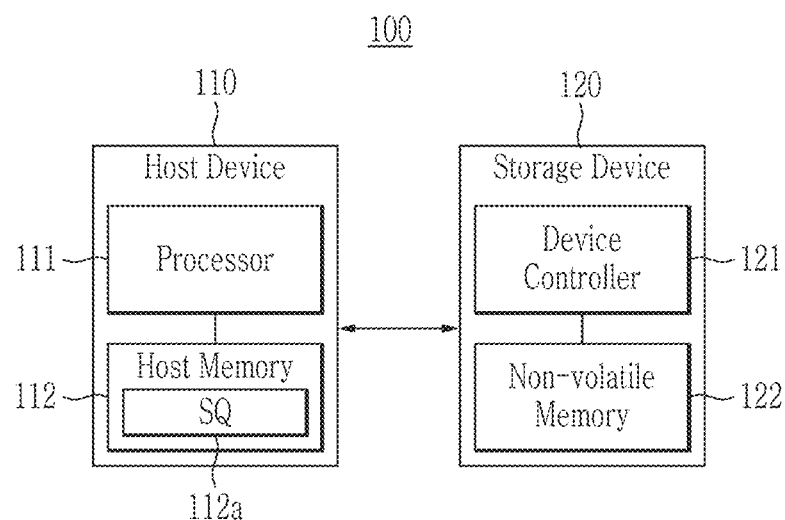
FIG. 1 is an exemplary block diagram of a storage system according to an embodiment.

In the following detailed description, only certain embodiments of the present invention are shown and described, simply by way of illustration. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. The sequence of operations or steps is not limited to the order presented in the figures unless specifically indicated otherwise. The order of operations or steps may be changed, several operations or steps may be merged, a certain operation or step may be subdivided, and a specific operation or step may not be performed.

As used herein, the singular forms "a" and "an" are intended to include the plural forms as well, unless the context clearly indicates otherwise. Although terms such as, first, second, and the like may be used herein to describe various elements, components, steps and/or operations, these terms are only used to distinguish one element, component, step or operation from another element, component, step, or operation, no order or numerical meaning is implied.

FIG. 1 is an exemplary block diagram of a storage system according to an embodiment.

Referring to FIG. 1, a storage system 100 may include a host device 110 and a storage device 120.

The host device 110 may include a computing platform (or computing device) that may interface with the storage device 120. The host device 110 may be, by way of non-limiting example, a desktop computer, a server computer, a tablet computer, a laptop computer, a mobile phone such as a smartphone, a multimedia player, a game console, a television, or various types of Internet of Things (I) devices.

The host device 110 may include a processor 111 and a host memory 112. The processor 111 may perform various operations (e.g., operations such as arithmetic, logic, controlling, and input/output (I/O) operations) by executing instructions. The processor 111 may be, by way of non-limiting example, a central processing unit (CPU), a graphics processing unit (GPU), a microprocessor, or an application processor (AP). The host memory 112 may be a system memory that is accessed and used by the processor 111. The host memory 112 may, by way of non-limiting example, include a random-access memory, such as dynamic random-access memory (DRAM), for example, without being limited thereto.

The storage device 120 may be a non-volatile memory-based storage device, and may include a device controller 121 and a non-volatile memory 122. The device controller 121 may control access to the non-volatile memory 122. In some embodiments, the device controller 121 may support a non-volatile memory express (NVMe) protocol as a protocol for accessing the non-volatile memory 122. In some embodiments, the non-volatile memory may include a flash-based memory, by way of non-limiting example, a NAND flash memory. In some embodiments, the non-volatile memory may include, by way of non-limiting example, a phase-change memory, a resistive memory, a magnetoresistive memory, a ferroelectric memory, or a polymer memory and the like.

In some embodiments, the storage device 120 may be removably connected to the host device 110. In other embodiments, the storage device 120 may be integrated into the host device 110 or non-removably connected to the host device 110.

The host device 110 may perform the various operations by submitting commands to the storage device 120. For example, the host device 110 may read data from the storage device 120 by submitting a read command to the storage device 120, or write data to the storage device 120 by submitting a write command to the storage device 120.

In order for the host device 110 to read or write the data from the storage device 120, the processor 111 may generate a command (e.g., the read command or the write command), and submit (or write) the command to a submission queue (SQ) 112a of the host memory 112. In some embodiments, the submission queue 112a may support the NVMe protocol. The device controller 121 may peek the command submitted to the submission queue 112a of the host memory 112, to determine whether the command is executable based on a device resource status of the device controller 121, and may fetch and execute the command in response to determining that the command is executable. In some embodiments, "peek" of a command may refer to an operation that brings the command from the submission queue to the device controller but leaves the command in the submission queue to be brought again. Accordingly, the device controller 121 may peek the command by bringing the command from the submission queue 112a without moving a head pointer of the submission queue 112a, and fetch the command from the submission queue 112a by moving the head pointer of the submission queue 112a after peeking the command. The device controller 121 may transfer the data from the non-volatile memory 122 to the host memory 112 by executing the read command, or may transfer the data from the host memory 112 to the non-volatile memory 122 by executing the write command.

Figure 2:
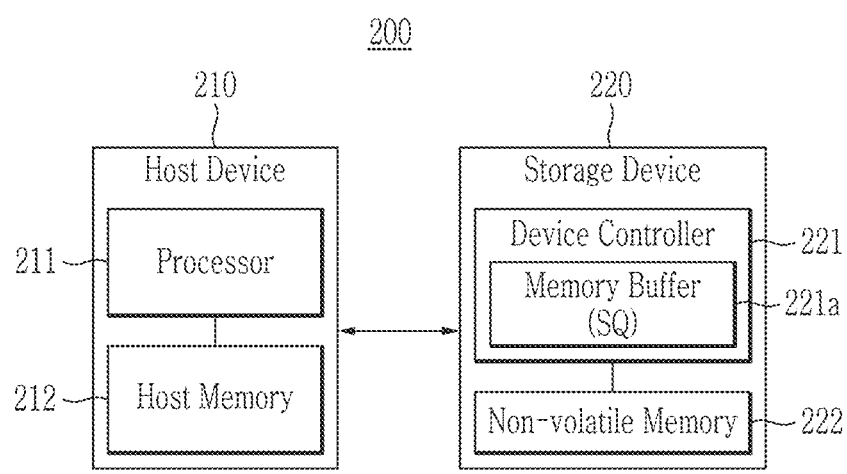
FIG. 2 is an exemplary block diagram of a storage system according to an embodiment.

FIG. 2 is an exemplary block diagram of a storage system according to an embodiment.

Referring to FIG. 2, a storage system 200 may include a host device 210 and a storage device 220.

The host device 210 may include a processor 211 and a host memory 212. The storage device 220 may include a device controller 221 and a non-volatile memory 222. Unlike the embodiments described with reference to FIG. 1, the device controller 221 may further include a memory buffer 221a in which a submission queue to which a command from the host device 210 is to be submitted (or written) is formed. In some embodiments, the memory buffer 221a may be a controller memory buffer (CMB) supporting the NVMe protocol.

In order for the host device 210 to read or write the data from the storage device 220, the processor 211 may generate a command and submit the command to the submission queue of the memory buffer 221a. The device controller 221 may peek the command submitted to the submission queue of the memory buffer 221a, determine whether the command is executable based on a device resource status of the device controller 221, and fetch and execute the command in response to determining that the command is executable. The device controller 221 may peek the command from the submission queue without moving a head pointer of the submission queue, and fetch the command from the submission queue by moving the head pointer of the submission queue. The device controller 221 may transfer the data from the non-volatile memory 222 to the host memory 212 by executing a read command, or may transfer the data from the host memory 212 to the non-volatile memory 222 by executing a write command.

Figure 3:
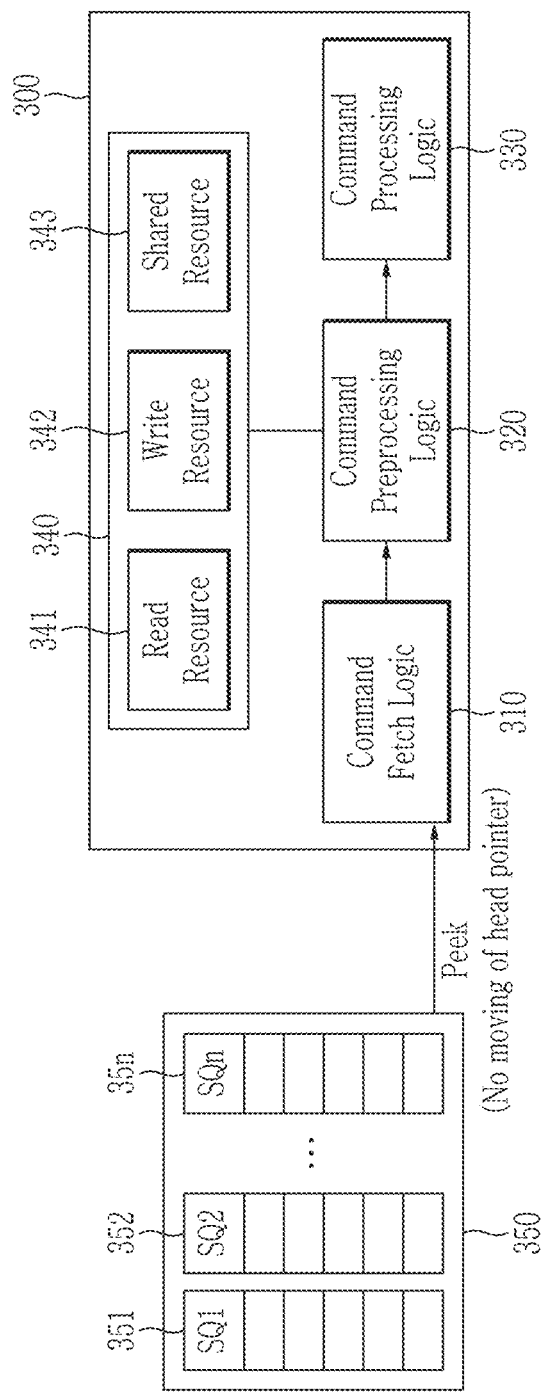
FIG. 3 is an exemplary block diagram of a device controller in a storage device according to an embodiment.
Figure 4:
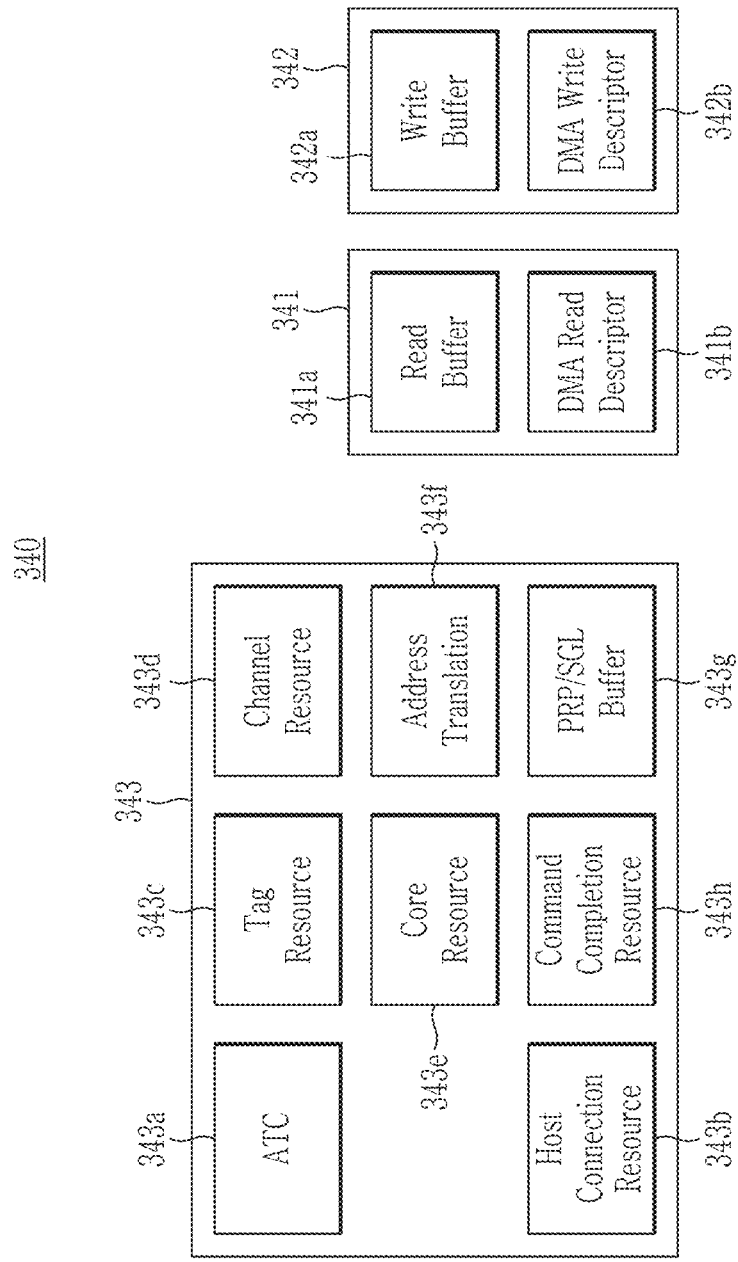
FIG. 4 is an exemplary diagram showing device resources of a device controller according to an embodiment.
Figure 5:
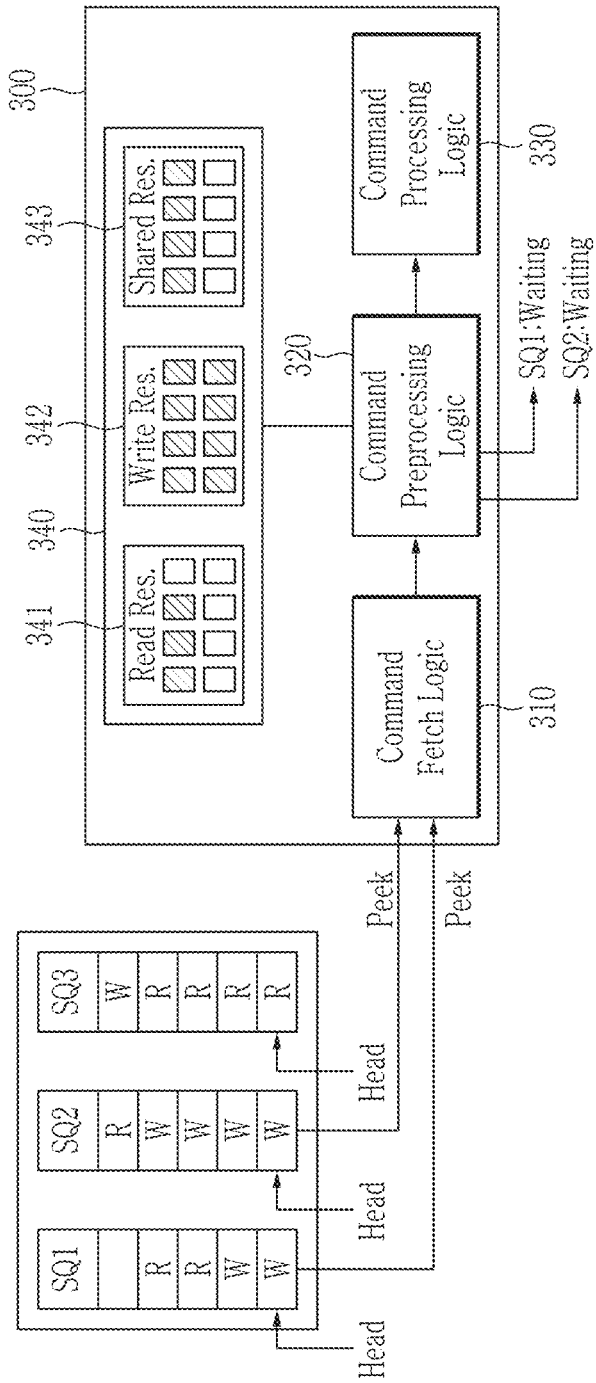
FIG. 5 and FIG. 6 are drawings explaining an exemplary operation of a device controller shown in FIG. 3.
Figure 6:
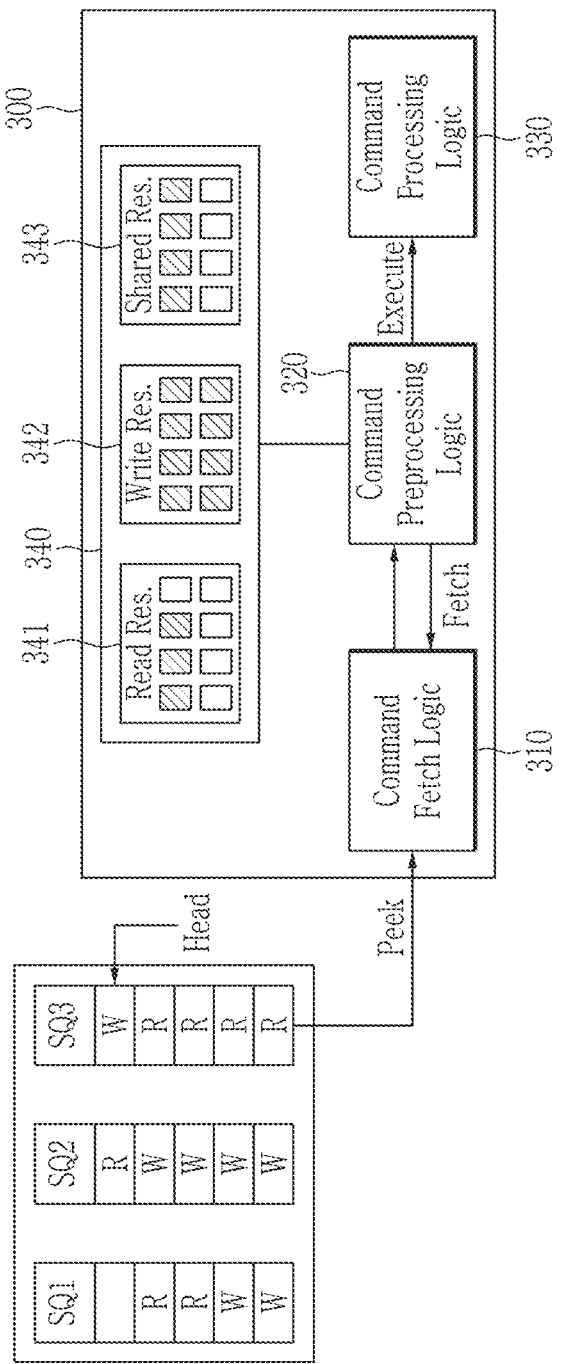

FIG. 3 is an exemplary block diagram of a device controller in a storage device according to an embodiment, FIG. 4 is an exemplary diagram showing device resources of a device controller according to an embodiment, and FIG. 5 and FIG. 6 are drawings explaining an exemplary operation of a device controller shown in FIG. 3.

Referring to FIG. 3, a device controller 300 may include a command fetch logic 310, a command preprocessing logic 320, a command processing logic 330, and device resources 340.

In some embodiments, the device controller 300 may further include a memory buffer 350, and the memory buffer 350 may include a plurality of submission queues 351, 352 . . . 35n. In some embodiments, the plurality of submission queues 351 to 35n may be formed in a host memory (e.g., 112 in FIG. 1) of a host device. The submission queues 351 to 35n may be expressed as SQ1, SQ2 . . . SQn, respectively. The host device may generate a command and submit the generated command to a submission queue 35i. In some embodiments, after submitting the command to the submission queue 35i, the host device may update a register (e.g., an SQ tail doorbell register) corresponding to the submission queue 35i in the device controller 300 with a new tail pointer.

The command fetch logic 310 may peek the command from the submission queue 35i. When peeking the command from the submission queue 35i, the command fetch logic 310 may not move a head pointer of the submission queue 35i. The command fetch logic 310 may temporarily store the peeked command in a buffer of the device controller 300 or a buffer of a storage device including the device controller 300. In some embodiments, the command fetch logic 310 may select a target submission queue 35i from among the submission queues 351 to 35n and peek the command from the selected submission queue 35i. The command fetch logic 310 may select the target submission queue 35i based, for example, on an arbitration mechanism supported by the device controller 300. In some embodiments, the command fetch logic 310 may determine the number of commands to be peeked from the submission queue 35i based on an arbitration burst size and the number of available commands in the submission queue 35i. The arbitration burst size may mean the maximum number of commands that may be launched at one time from the submission queue. The command fetch logic 310 may determine, for example, the smaller of the arbitration burst size and the number of available commands in the submission queue 35i as the number of commands to be peeked from the submission queue 35i. The number of available commands in the submission queue 35i may correspond to the number of commands from a head before a tail of the submission queue 35i. The head may be an entry indicated by a head pointer in the submission queue 35i, and the tail may be an entry indicated by a tail pointer in the submission queue 35i. Accordingly, the command fetch logic 310 may peek the determined number of commands from the head of the submission queue 35i.

The command preprocessing logic 320 may determine whether the peeked command is executable based on a status of the device resources 340. The command preprocessing logic 320 may determine whether the peeked command is executable by determining whether the device resources 340 for executing the peeked command are available. In some embodiments, the device resources 340 may include read resources 341 dedicated to a read command and write resources 342 dedicated to a write command. The device resource 340 may further include shared resources 343 shared by the read command and the write command.

The command preprocessing logic 320 may determine that the peeked command is executable when determining that resources for executing the peeked command among the device resources 340 are available. In some embodiments, since a type of resources may be different depending on an I/O type of the peeked command, the command preprocessing logic 320 may determine whether resources for executing the peeked command are available based on the I/O type of the peeked command, the shared resources 343, and resources corresponding to the I/O type among the read resources 341 and the write resources 342. In some embodiments, since an amount of required resources may vary depending on a size of the peeked command, the command preprocessing logic 320 may determine whether the resources for executing the peeked command are available based on the I/O type and size of the peeked command. The command preprocessing logic 320 may determine that the peeked command is not executable when the resources for executing the peeked command among the device resources 340 are unavailable because they are occupied for other I/O processing. For example, the command preprocessing logic 320 may determine that the read command is not executable when the read resources 341 or the shared resources 343 are unavailable because they are occupied, and determine that the read command is executable when the read resources 341 and the shared resources 343 are available. In addition, the command preprocessing logic 320 may determine that a write command is not executable when the write resources 342 or the shared resources 343 are unavailable because they are occupied, and determine that the write command is executable when the write resources 342 and the shared resources 343 are available.

When determining that the peeked command is executable, the command preprocessing logic 320 may fetch the corresponding command through the command fetch logic 310 and instruct the command processing logic 330 to execute the fetched command. The command fetch logic 310 may fetch the command from the submission queue 35i by moving the head pointer in the submission queue 35i by the number of fetched commands (entries). Accordingly, the head pointer of the submission queue 35i may be moved to a next entry of the fetched commands.

The command processing logic 330 may allocate the device resources 340 to the fetched command and execute the fetched command. In some embodiments, the command processing logic 330 may put the fetched command into a command processing pipeline for execution. The command processing logic 330 may put the fetched command into a command processing queue of the command processing pipeline, retrieve the command from the command processing queue, and execute the command. The command processing pipeline may include a set of processing engines that perform the command processing (command execution) using the device resources 340.

When the command preprocessing logic 320 determines that the peeked command is not executable, the command processing logic 330 may not fetch the peeked command. Accordingly, the head pointer of the submission queue 35i may be maintained without being moved. The command preprocessing logic 320 may not instruct the command processing logic 330 to execute the command, and may drop the peek command without fetching the command. Accordingly, the command processing logic 330 may not allocate the device resources 340 to the peeked command and may not put the peeked command into the command processing pipeline. In addition, the command preprocessing logic 320 may mark the submission queue 35i as a resource waiting state. In some embodiments, the resource waiting state may include information indicating a waiting resource. The information indicating the waiting resource may include, for example, a type of the waiting resource and an amount of the waiting resource.

After processing the target submission queue 35i, the device controller 300 may select a next target submission queue 35j from among the plurality of submission queues 351 to 35n, and may repeat the operations of peeking a command from the target submission queue 35j and determining whether the command is executable.

In some embodiments, the command preprocessing logic 320 may monitor the status of the device resources 340 and determine whether the submission queue 35i marked as the waiting state is processable based on the status of the device resources 340. In some embodiments, the command preprocessing logic 320 may determine that the submission queue 35i is processable when the resources for the submission queue 35i marked as the waiting state become available. When determining that the submission queue 35i is processable, the command preprocessing logic 320 may designate the submission queue 35i as an available submission queue 35i. Accordingly, as described above, the operations of peeking a command from the submission queue 35i and determining whether the command is executable may be performed. In some embodiments, when the resources for the submission queue 35i marked as the waiting state become available, the command preprocessing logic 320 may fetch the command from the submission queue 35i and instruct the command processing logic 330 to execute the command without performing the operation of peeking the command again. In some embodiments, when the resources become available, the command preprocessing logic 320 may prioritize the submission queue 35i marked as the waiting state over other submission queues. For example, the command preprocessing logic 320 may add the submission queue 35i marked as the waiting state to a head of a list of available submission queues.

In some embodiments, when the command processing logic 330 completes execution of a command of a specific I/O type, resources for the specific I/O type may become available. When the command processing logic 330 completes processing of a specific type in the command processing pipeline, resources for the specific type may become available. For example, when the command processing logic 330 completes execution of a read command, the read resources 341 and the shared resources 343 may become available. When the command processing logic 330 completes execution of a write command, the write resources 342, and the shared resources 343 may become available.

Referring to FIG. 4, in some embodiments, read resources 341, write resources 342, or shared resources 343 may include various types of resources. The read resources 341 may include at least one of a read buffer 341a or a direct memory access (DMA) read descriptor 341b, and the write resources 342 may include at least one of a write buffer 342a or a DMA write descriptors 342b.

The read buffer 341a may temporarily store data read from a non-volatile memory (e.g., 122 in FIG. 1 or 222 in FIG. 2), and the DMA read descriptor 341b may store information related to DMA transfer from a storage device to a host memory (e.g., 112 in FIG. 1 or 212 in FIG. 2). The write buffer 342a may temporarily store data to be written to the non-volatile memory 122 or 222, and the DMA write descriptor 342b may store information related to DMA transfer from the host memory 112 or 212 to the storage device.

The shared resources 343 may include a plurality of types of shared resources. The plurality of types of shared resources may include at least one of an address translation cache (ATC) resource 343a, a host connection resource 343b, a tag resource 343c, a channel resource 343d, a core resource 343e, an address translation resource 343f, a physical region page (PRP)/scatter gather list (SGL) buffer 343g, or a command completion resource 343h.

The address translation cache 343a may store address translation data used when translating a virtual address pointed by a PRP or SGL parsed from a command into a physical address of the host memory 112 or 212. The host connection resource 343b may include a resource related to an interface (e.g., peripheral component interconnect express (PCIe) interface) used for connection with the host. The tag resource 343c may include a resource (tag) that is allocated for unique identification of a command within the command processing pipeline. The channel resource 343d may include a resource related to a channel between the device controller 300 and the non-volatile memory 122 or 222. The core resource 343e may include a processing core resource for processing a command in the command processing logic. The address translation resource 343f may include a resource that translates a logical address (e.g., a logical block address (LBA)) parsed from a command into a physical address (e.g., a physical page number (PPN)) of the non-volatile memory 122 or 222). The PRP/SGL buffer 343g may temporarily store a PRP or SGL parsed from the command. The command completion resource 343h may include a resource for processing command completion.

In a case where different types of resources are required to execute a command, if some types of resources are available but some other types of resources are unavailable, the command preprocessing logic 320 may determine that the command is not executable and may not fetch the command. Further, if some types of shared resources (e.g., tag resources 343c) are available but some other types of shared resources (e.g., address translation resources 343f) are unavailable among the plurality of types of shared resources 343a-343h, the command preprocessing logic 320 may determine that the shared resources 343 are unavailable.

For example, as shown in FIG. 5 and FIG. 6, it is assumed that two write commands and two read commands are input to a submission queue SQ1, four write commands and one read command are input to a submission queue SQ2, four read commands and one write command are input to a submission queue SQ3, heads pointer point to the first entries in the submission queues SQ1, SQ2, and SQ3, and an arbitration burst size is four. In FIG. 5 and FIG. 6, a write command is denoted by "W" and a read command is denoted by "R". Further, it is assumed that the write resources 342 among the device resources 340 are exhausted and are unavailable.

In this case, a conventional device controller may fetch the write commands from the submission queue SQ1 and wait until the write resources 342 for execution of the fetched write commands become available. Further, the device controller may block the shared resources 343 until the write resources become available. When the write resources 342 become available, the device controller may execute the write commands and the read command fetched from the submission queue SQ1 and then fetch the commands from the next submission queue SQ2. Therefore, since execution of all commands waits until the resources become available, the latency may increase. Furthermore, since the write commands occupy the shared resources 343 even when the write commands are waiting, even if the read commands are fetched while the read resources 341 are available, the read commands may not be executed until the shared resources 343 become available.

In some embodiments, as shown in FIG. 5, the command fetch logic 310 may select a target submission queue SQ1 from among the submission queues SQ1, SQ2, and SQ3, and peek the two write commands and the two read commands from the submission queue SQ1. Since the write resources 342 for executing the write commands are unavailable, the command preprocessing logic 320 may mark the submission queue SQ1 as in a resource waiting state. In this case, since the commands are peeked from the submission queue SQ1, the head pointer of the submission queue SQ1 may be maintained without being moved. The command fetch logic 310 may fetch the four write commands from the next submission queue SQ2. Similarly, the command preprocessing logic 320 may mark the submission queue SQ2 as in the resource waiting state because the write resources 342 for execution of the write commands are unavailable. In this case, since the commands are peeked from the submission queue, the head pointer of the submission queue SQ2 may be maintained without being moved.

As shown in FIG. 6, the command preprocessing logic 320 may peek the four read commands from the next submission queue SQ3. Since the read resources 341 and the shared resources 343 for execution of the read commands are available, the command fetch logic 310 may fetch the read commands, and the command processing logic 330 may execute the fetched read commands. In this case, since the commands of the submission queue SQ3 are fetched, the head pointer of the submission queue SQ3 may be moved. Accordingly, the immediately executable commands can be executed first without waiting for the release of the occupied resources (the write resources 342), thereby reducing the waiting time and at the same time increasing the command processing efficiency.

Figure 7:
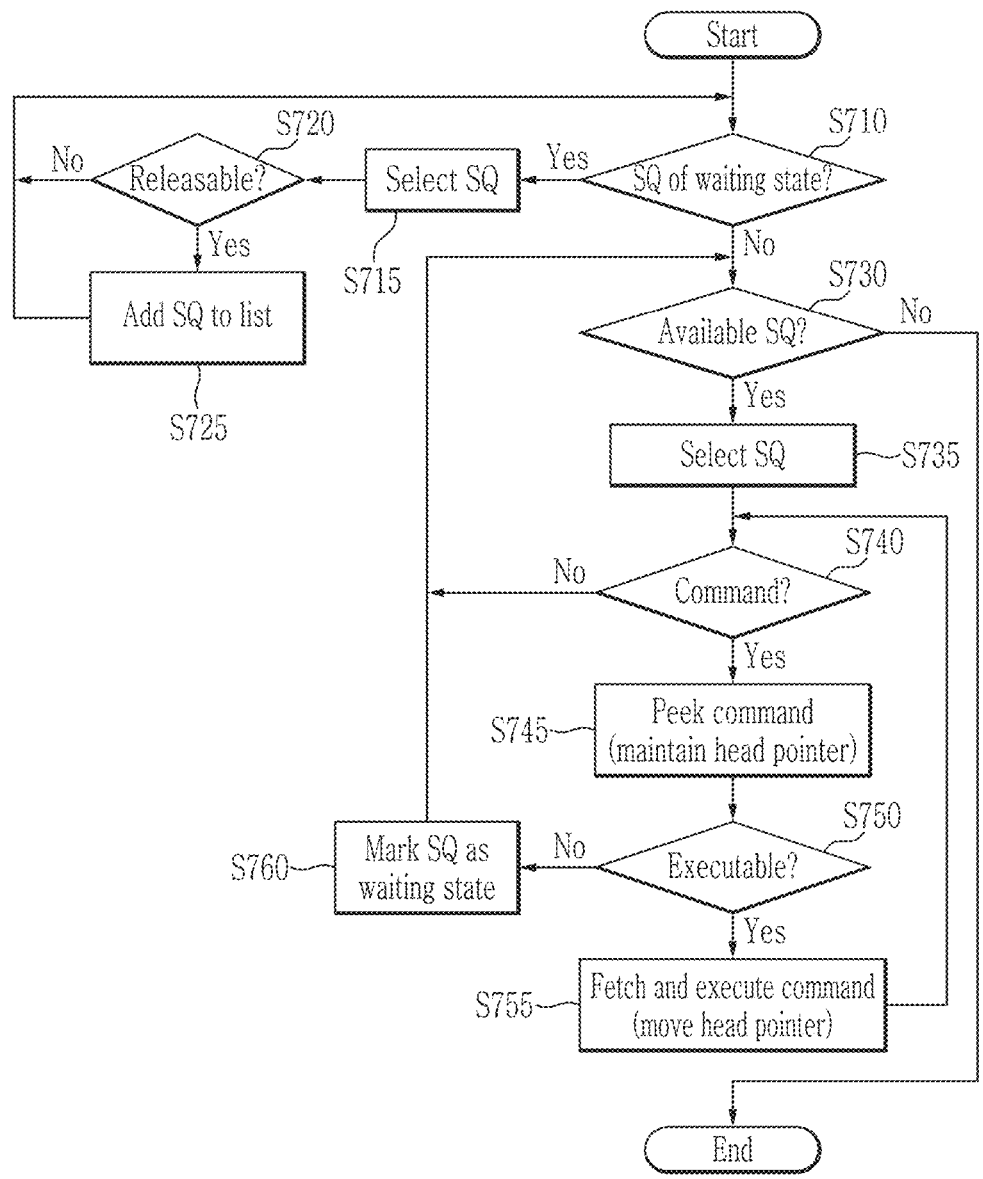
FIG. 7 is an exemplary flowchart showing an operation of a device controller in a storage device according to an embodiment.

FIG. 7 is an exemplary flowchart showing an operation of a device controller in a storage device according to an embodiment.

Referring to FIG. 7, when there is an available submission queue at S730, a device controller may select a target submission queue from among the available submission queues at S735. In some embodiments, the available submission queue may be a submission queue that is not marked as in a resource waiting state. When there is no available submission queue at S730, the device controller may end an operation. When there is a command in the target submission queue at S740, the device controller may peek the command from the target submission queue at S745. The device controller may peek the command from the target submission queue and maintain the head pointer without moving it at S745. In some embodiments, the device controller may peek from the target submission queue the commands corresponding to a minimum number between the arbitration burst size and the number of available commands in the target submission queue at S745.

The device controller may determine whether the peeked command is executable based on information including a status of device resources at S750. In some embodiments, the device controller may determine whether the command is executable based on the status of device resources, an I/O type of the command, and a size of the command at S750. When determining that the command is executable at S750, the device controller may fetch the command and put the command in a command processing pipeline (or a command processing queue) to execute the command at S755. The device controller may fetch the command by moving a head pointer in the target submission queue at S755. Next, the device controller may check again whether a next command exists in the target submission queue at S740.

When determining that the command is not executable at S750, the device controller may mark the target submission queue as in the resource waiting state at S760 and check whether there is an available submission queue at S730. In some embodiments, the resource waiting state may include information indicating a waiting resource. The information indicating the waiting resource may include, by way of non-limiting example, at least one of a type of a waiting resource or an amount of the waiting resource.

When there is no command in the target submission queue at S740, the device controller may select a next target submission queue from among the available submission queues at S730 and S735, and repeat the operations described with reference to S740 to S760.

In some embodiments, in order to process the submission queue marked as in the waiting state, the device controller may check whether there is the submission queue designated as in the resource waiting state at S710. When the submission queue marked as in the resource waiting state does not exist at S710, the device controller may select a target submission queue from among the available submission queues at S730 and S735, and repeat the operations described with reference to S740 to S760.

When the submission queue marked as in the resource waiting state exists at S710, the device controller may select a submission queue from among the submission queues marked as in the resource waiting state at S715. The device controller may determine whether the resource waiting state of the selected submission queue can be released based on the status of the device resources at S720. In some embodiments, the device controller may determine whether the resource waiting state of the selected submission queue can be released based on the status of the device resources and information of the resource waiting state at S720. For example, when resources corresponding to the type of the waiting resource and the amount of the waiting resource are available in the device resources, the device controller may release the resource in the waiting state of the selected submission queue. When the resource in the waiting state cannot be released, the device controller may determine whether another submission queue marked as in the resource waiting state exists at S710.

When the resource in the waiting state can be released, the device controller may add the selected submission queue to a list of available submission queues at S725. In some embodiments, the device controller may add the selected submission queue to a head of the list of available submission queues so that the selected submission queue can be selected first according to an arbitration mechanism. Next, the device controller may check whether another submission queue marked as in the resource waiting state exists at S710, and repeat the operations described with reference to S715 to S725, or the operations described with reference to S730 to S760.

Next, an exemplary embodiment in which an address translation resource is used as a shared resource is described with reference to FIG. 8.

Figure 8:
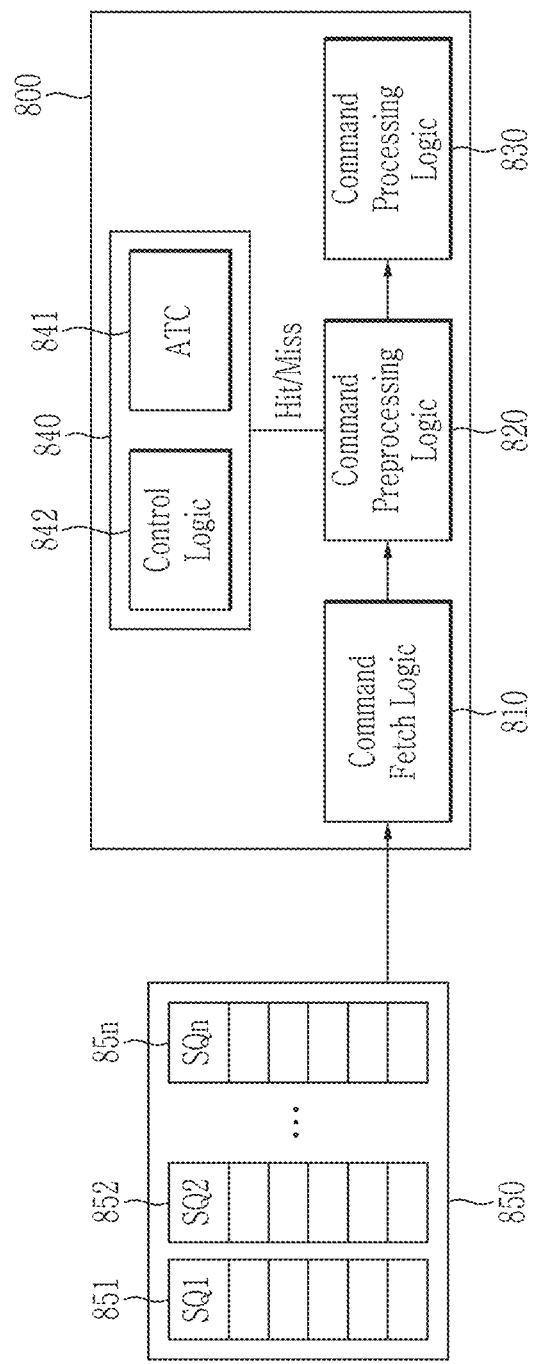
FIG. 8 is an exemplary block diagram of a device controller of a storage device according to an embodiment.

FIG. 8 is an exemplary block diagram of a device controller of a storage device according to an embodiment.

Referring to FIG. 8, a device controller 800 may include a command fetch logic 810, a command preprocessing logic 820, a command processing logic 830, and an address translation circuit 840.

In some embodiments, the device controller 800 further includes a memory buffer 850, and the memory buffer 850 may include a plurality of submission queues 851, 852 . . . 85n. In some embodiments, the plurality of submission queues 851 to 85n may be formed in a host memory (e.g., 112 in FIG. 1) of a host device.

The address translation circuit 840 may include an address translation cache (ATC) 841 and a control logic 842. The address translation cache 841 may have a plurality of entries, and each entry may store address translation data to be used when translating a virtual address into a physical address of a host memory (e.g., 112 in FIG. 1 or 212 in FIG. 2). The virtual address may be an address pointed by a PRP or SGL of a command. The control logic 842 may determine whether a command (i.e., a virtual address of the command) hits in the address translation cache 841. If the hit occurs, the control logic 842 may translate the virtual address of the command to a physical address based on the hit entry. If the command misses in the address translation cache 841, the control logic 842 requests the physical address corresponding to the virtual address of the command from the host device (e.g., 110 in FIG. 1 or 210 in FIG. 2). In some embodiments, the control logic 842 may request the physical address via an address translation service (ATS)/page request interface (PRI).

The command fetch logic 810 may select a target submission queue 85i from the submission queues 851 to 85n, and peek the command from the selected submission queue 85i.

The command preprocessing logic 820 may determine whether the command is executable based on whether the peeked command hits in the address translation cache 841. If the command hits in the address translation cache 841, the command preprocessing logic 820 may determine that the command is executable, fetch the command through the command fetch logic 810, and instruct the command processing logic 830 to execute the command. The command processing logic 830 may put the command into a command processing pipeline, translate a virtual address of the command into a physical address through the address translation circuit 840, and execute the command. Even if the peeked command hits in the address translation cache 841, if other resources for executing the peeked command are insufficient, the command preprocessing logic 820 may determine that the command is not executable.

If the peeked command misses the address translation cache 841, the control logic 842 of the address translation circuit 840 may request the physical address corresponding to the virtual address of the peeked command from the host device, and the command preprocessing logic 820 may mark the submission queue 85i as in a resource waiting state. When the control logic 842 receives the physical address from the host device and then the address translation cache 841 becomes available, the device controller 800 may release the resource waiting state of the submission queue 85i and execute the command of the submission queue 85i.

Figure 9:
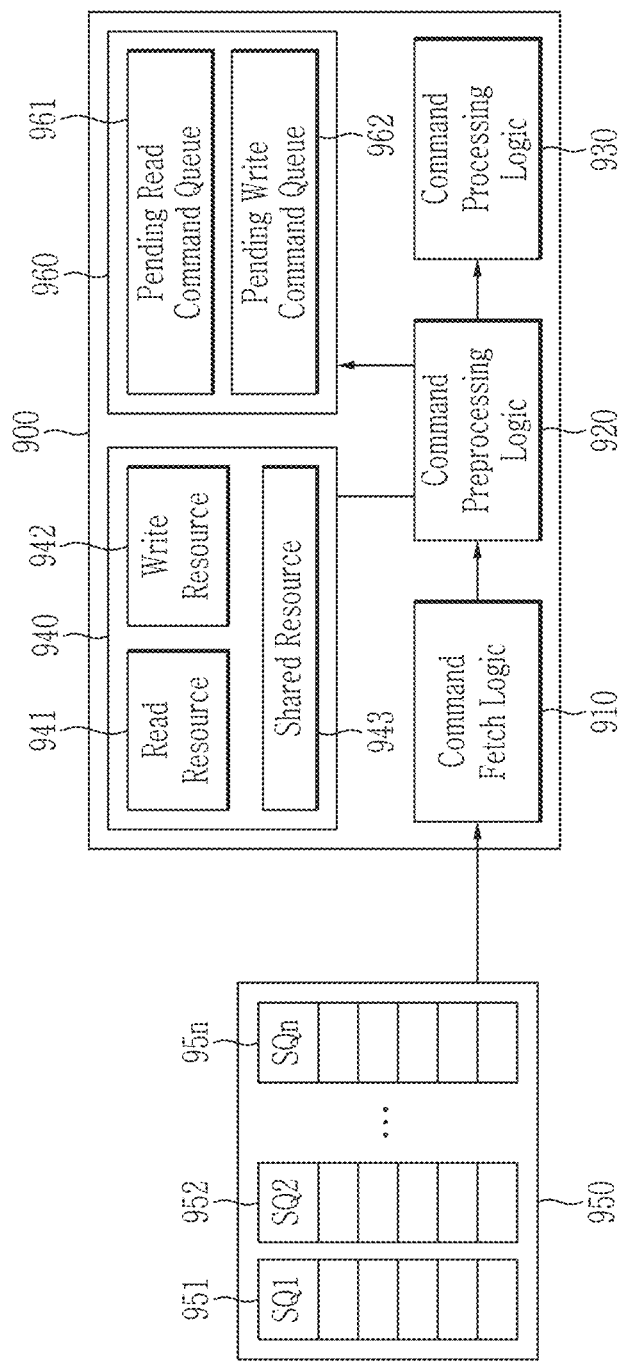
FIG. 9 is an exemplary block diagram of a device controller in a storage device according to an embodiment.
Figure 10:
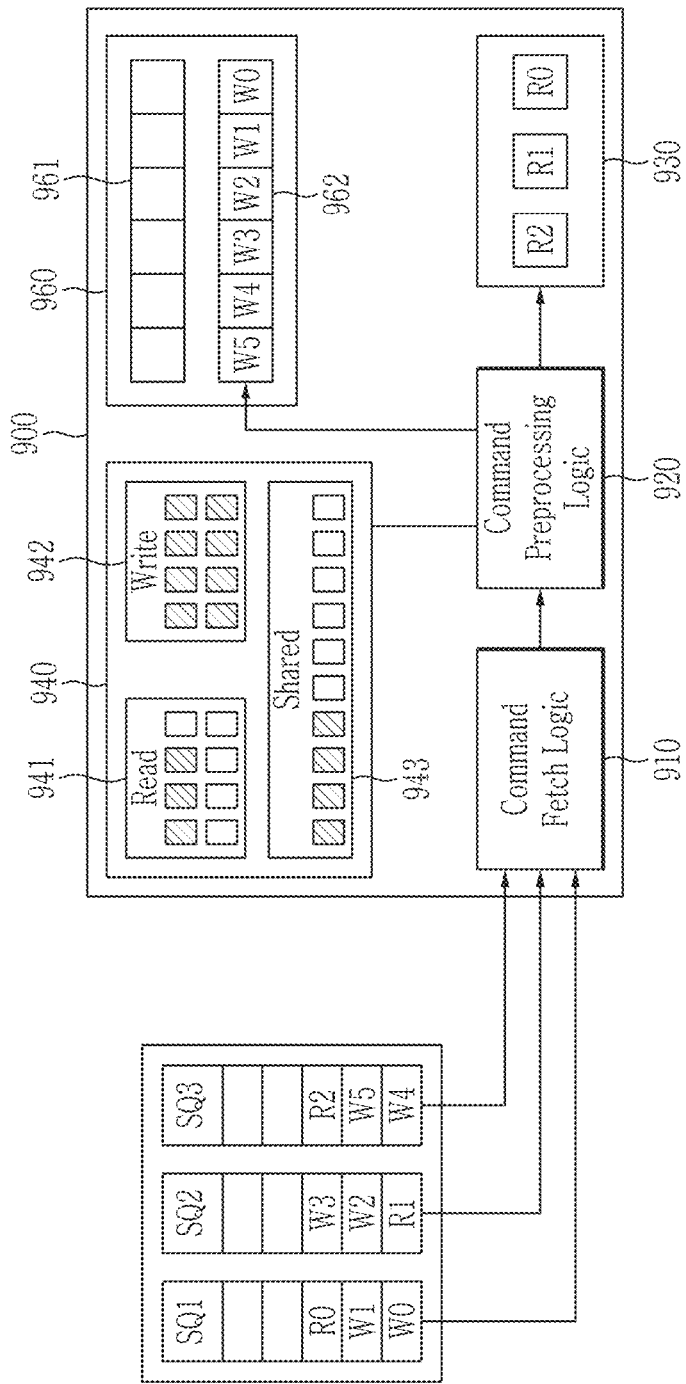
FIG. 10 is a diagram explaining an exemplary operation of a device controller shown in FIG. 9.

FIG. 9 is an exemplary block diagram of a device controller in a storage device according to an embodiment, and FIG. 10 is a diagram explaining an exemplary operation of a device controller shown in FIG. 9.

Referring to FIG. 9, a device controller 900 may include a command fetch logic 910, a command preprocessing logic 920, a command processing logic 930, device resources 940, and a pending command queue 960.

In some embodiments, the device controller 900 may further include a memory buffer 950, and the memory buffer 950 may include a plurality of submission queues 951, 952 . . . 95n. In some embodiments, the submission queues 951 to 95n may be formed in a host memory (e.g., 112 in FIG. 1) of a host device.

In some embodiments, the pending command queue 960 may include a pending read command queue 961 that stores inexecutable read commands and a pending write command queue 962 that stores inexecutable write commands. In some embodiments, a size of the pending command queue may be set based on an arbitration burst size, the number of submission queues 951 to 95n, and the maximum number of commands that the device controller 900 can execute simultaneously.

The command fetch logic 910 may peek a command from the submission queue 95i. When peeking the command from submission queue 95i, the command fetch logic 910 may not move a head pointer of submission queue 95i. In some embodiments, the command fetch logic 910 may select a target submission queue 95i from among the submission queues 951 to 95n and peek the command from the target submission queue 95i.

The command preprocessing logic 920 may determine whether the peeked command is executable based on a status of the device resources 940. In some embodiments, the device resource 940 may include read resources 941 for processing a read command and write resources 942 for processing a write command. The device resource 940 may further include shared resources 943 shared by the read command and the write command.

When determining that the peeked command is executable, the command preprocessing logic 920 may fetch the command through the command fetch logic 910 and instruct the command processing logic 930 to execute the fetched command. The command fetch logic 910 may move the head pointer of the submission queue 95i to fetch the command from the submission queue 95i. The command processing logic 930 may allocate device resources 940 to the fetched command and execute the fetched command. When determining that the peeked command is not executable, the command preprocessing logic 920 may put the inexecutable command into the pending command queue 960 without resource allocation, and fetch the command through the command fetch logic 910. That is, as the inexecutable command is moved to the pending command queue 960, the command fetch logic 910 may move the head pointer in the submission queue 95i.

In some embodiments, when determining that some commands are executable and remaining commands are not executable among the peeked commands, the command preprocessing logic 920 may instruct the command processing logic 930 to execute the executable commands and put the inexecutable command into the pending command queue 960. For example, when the commands peeked from the submission queue 95i by the command fetching logic 910 include a read command and a write command, and the read resources 941 are available but the write resources 942 are exhausted, the command preprocessing logic 920 may put the write command into the pending write command queue 962, and the command processing logic 930 may execute the read command. When the pending command queue 960 is full, the command preprocessing logic 920 may drop the peeked command without putting it into the pending command queue 960. In some embodiments, when the peeked command is dropped, the command preprocessing logic 920 may mark the submission queue 95i as in a resource waiting state, as described with reference to FIG. 3 to FIG. 8.

After processing the target submission queue 95i, the device controller 900 may select a next target submission queue 95j from among the submission queues 951 to 95n, and repeat the operations of peeking a command from the selected submission queue 95j and determining whether the peeked command is executable.

In some embodiments, the command preprocessing logic 920 may monitor the status of the device resources 940, and when resources for executing a command stored in the command pending queue 960 become available, fetch the command stored in the command pending queue 960 and instruct the command processing logic 930 to execute the fetched command. In some embodiments, the command preprocessing logic 920 may further perform a process of peeking the command stored in the command pending queue 960 and determining whether the peeked command is executable.

For example, as shown in FIG. 10, it is assumed that two write commands W0 and W1 and one read command R0 are input to a submission queue SQ1, one read command R1 and two write commands W2 and W3 are input to a submission queue SQ2, two write commands W4 and W5 and one read command R2 are input to a submission queue SQ3, head pointers point to the first entries in the submission queues SQ1, SQ2, and SQ3, and an arbitration burst size is three. Further, it is assumed that the write resources 942 among the device resources 940 are exhausted and are unavailable.

The command fetch logic 910 may select a target submission queue SQ1 from among the submission queues SQ1, SQ2, and SQ3, and peek the commands W0, W1, and R0 from the submission queue SQ1. Since the write resources 942 are unavailable, the command preprocessing logic 920 may put the write commands W0 and W1 into the pending write command queue 962. Further, since the read resources 941 and the shared resources 943 are available, the command preprocessing logic 920 may instruct the command processing logic 930 to execute the read command R0, and the command processing logic 930 may execute the read command R0.

The command fetch logic 910 may select the next target submission queue SQ2 and peek the commands R1, W2, and W3 from the submission queue SQ2. The command preprocessing logic 920 may instruct the command processing logic 930 to execute the read command R1, and the command processing logic 930 may execute the read command R1. Further, since the write resources 942 are unavailable, the command preprocessing logic 920 may put the write commands W2 and W3 into the pending write command queue 962.

The command fetch logic 910 may select the next target submission queue SQ3 and peek the commands W4, W5, and R2 from the submission queue SQ3. Since the write resources 942 are unavailable, the command preprocessing logic 920 may put the write commands W4 and W5 into the pending write command queue 962, and instruct the command processing logic 930 to execute the read command R2.

When the write resources 942 become available, the command preprocessing logic 920 may fetch the write commands W0 to W5 from the pending write command queue 962, and instruct the command processing logic 930 to execute the write commands W0 to W5.

Figure 11:
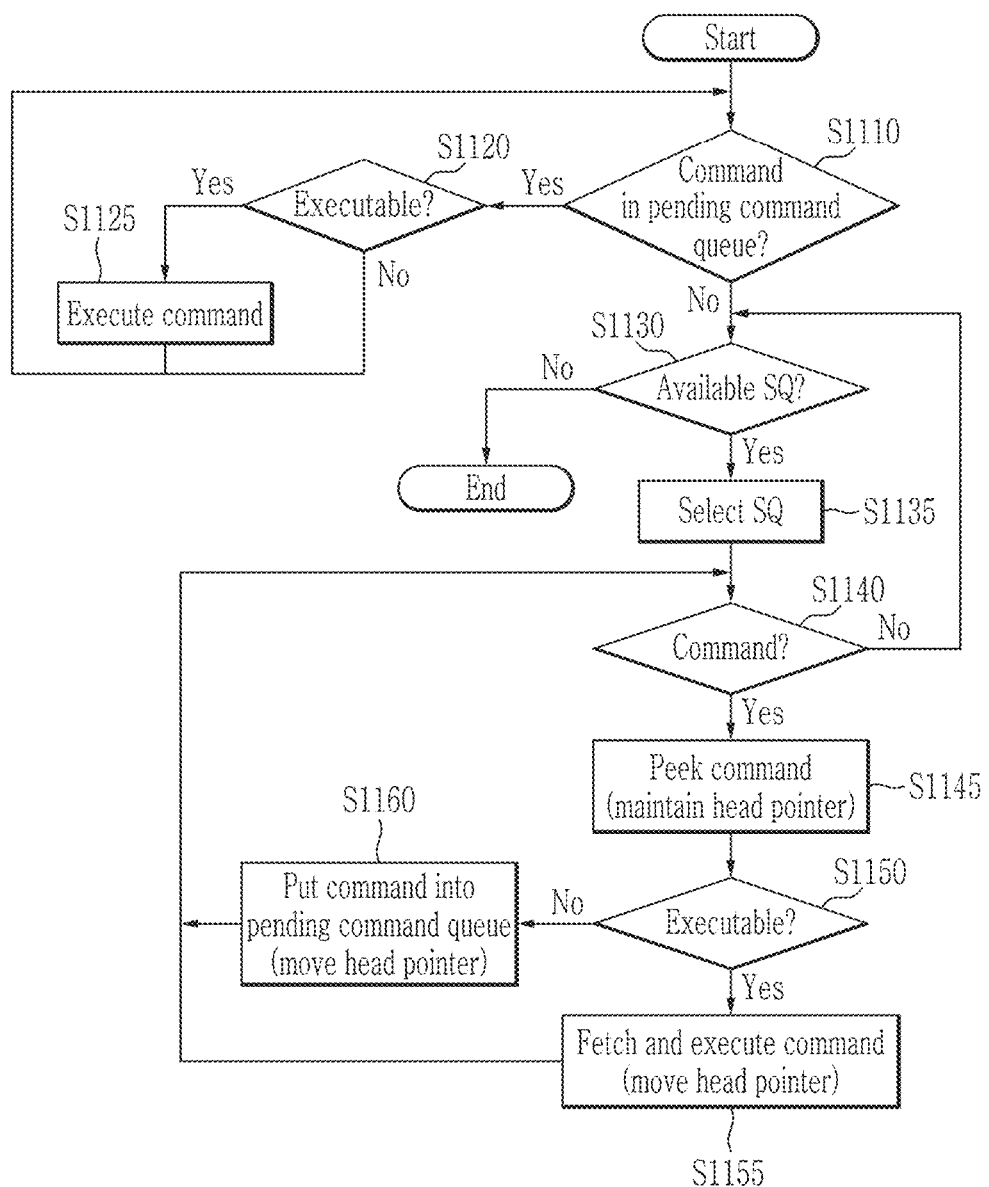
FIG. 11 is an exemplary flowchart showing an operation of a device controller in a storage device according to an embodiment.

FIG. 11 is an exemplary flowchart showing an operation of a device controller in a storage device according to an embodiment.

Referring to FIG. 11, when there is an available submission queue at S1130, a device controller may select a target submission queue from among the available submission queues at S1135. When there is no available submission queue at S1130, the device controller may end an operation. When commands exist in the target submission queue S1140, the device controller may peek commands from the target submission queue at S1145. The device controller may peek the commands from the target submission queue and maintain the head pointer without moving it at S1145.

The device controller may determine whether the peeked commands are executable based on information including a status of device resources at S1150. When there is an executable command among the peeked commands at S1150, the device controller may fetch the executable command and put the executable command into a command processing pipeline (or a command processing queue) to execute the command at S1155. The device controller may fetch the command by moving a head pointer in the target submission queue at S1155. If there is an inexecutable command among the fetched commands at S1150, the device controller may put the inexecutable command into a pending command queue at S1160. In some embodiments, the device controller may put the inexecutable command into the pending command queue and fetch the command from the submission queue at S1160. The device controller may fetch the command by moving the head pointer in the target submission queue at S1160.

The device controller may check whether a next command exists in the target submission queue at S1140. When the next command exists in the target submission queue at S1140, the device controller may repeat the operations described with reference to S1145 to S1160.

When there is no command in the target submission queue at S1140, the device controller may select a next target submission queue from among the available submission queues at S1130 and S1135, and repeat the operations described with reference to S1140 to S1160.

In some embodiments, in order to process the pending command queue, the device controller may check whether a command exists in the pending command queue at S1110. If there is no command in the pending command queue at S1110, the device controller may select a target submission queue from among the available submission queues at S1130 and S1135, and repeat the operations described with reference to S1140 to S1160.

When a command exists in the pending command queue at S1110, the device controller may determine whether the command of the pending command queue is executable at S1120. In some embodiments, the device controller may determine whether the command of the pending command queue is executable based on the status of the device resource and an I/O type of the pending command queue at S1120. For example, the device controller may determine that the command in the pending read command queue is executable when the shared resources and the read resources are available, and determine that the command in the pending write command queue is executable when the shared resources and the write resources are available. When the command of the pending command queue is executable, the device controller may fetch and execute the command of the pending command queue at S1125.

When the command of the pending command queue is not executable at S1120, the device controller may select a target submission queue from the available submission queues at S1130 and S1135, and repeat the operations described with reference to S1140 to S1160.

Figure 12:
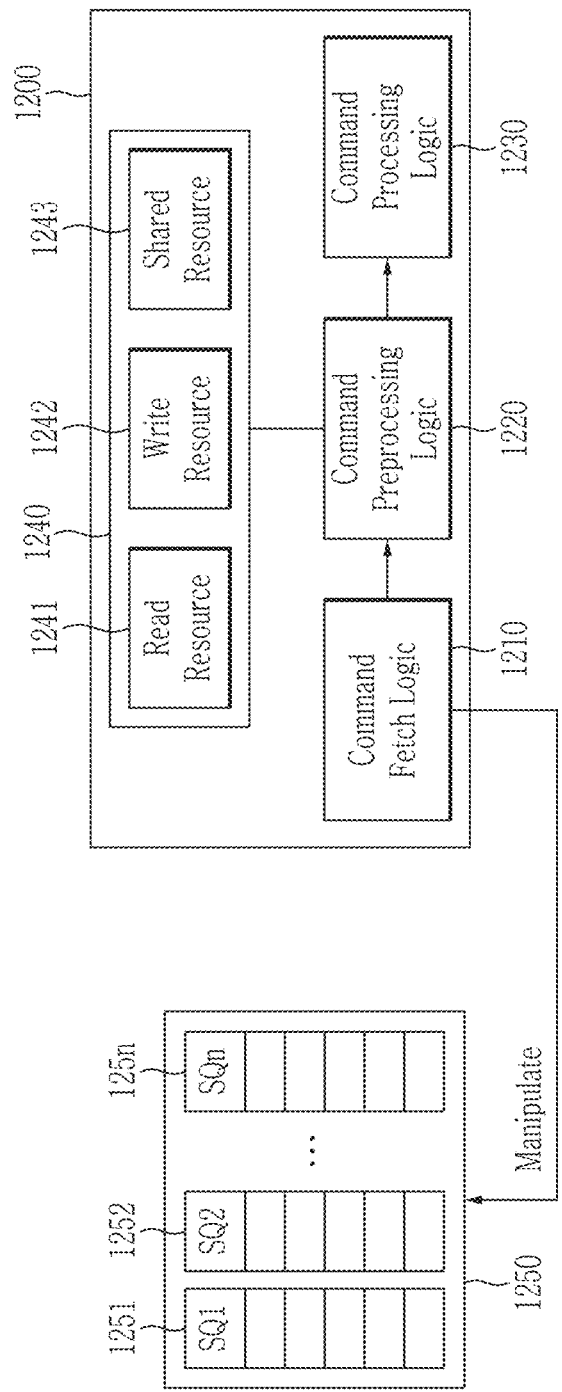
FIG. 12 is an exemplary block diagram of a device controller in a storage device according to another embodiment.
Figure 13:
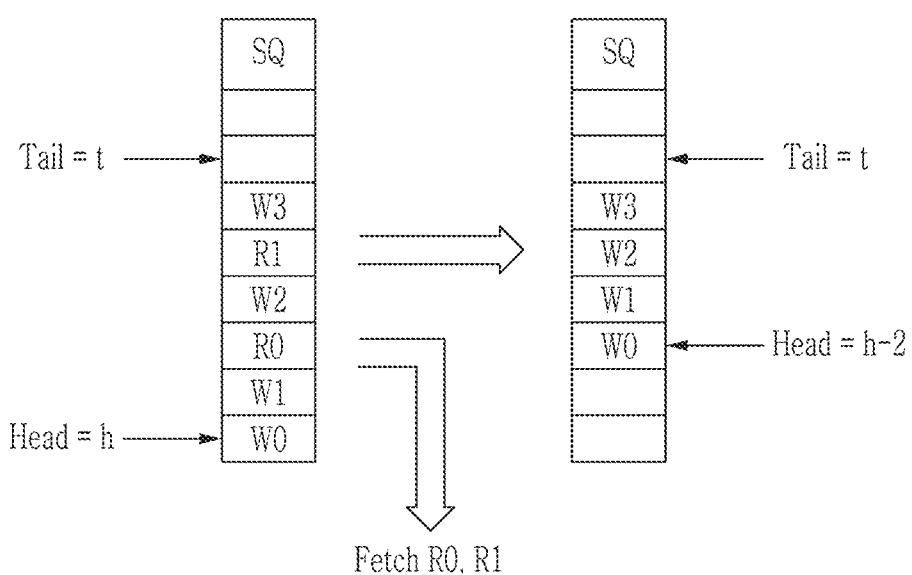
FIG. 13 is a diagram explaining an exemplary operation of a device controller shown in FIG. 12.

FIG. 12 is an exemplary block diagram of a device controller in a storage device according to another embodiment, and FIG. 13 is a diagram explaining an exemplary operation of a device controller shown in FIG. 12.

Referring to FIG. 12, a device controller 1200 may include command fetch logic 1210, a command preprocessing logic 1220, a command processing logic 1230, and device resources 1240.

In some embodiments, the device controller 1200 may further include a memory buffer 1250, and the memory buffer 1250 may include a plurality of submission queues 1251, 1252, ... 125n. In some embodiments, the submission queues 1251 to 125n may be formed in a host memory (e.g., 112 of FIG. 1) of a host device.

The command fetch logic 1210 may peek a command from the submission queue 125i. When peeking the command from the submission queue 125i, the command fetch logic 1210 may not move a head pointer of the submission queue 125i. In some embodiments, the command fetch logic 1210 may select a target submission queue 125i from among the submission queues 1251 to 125n and peek the command from the selected target submission queue 125i.

The command preprocessing logic 1220 may determine whether the peeked command is executable based on a status of the device resources 1240. In some embodiments, the device resources 1240 may include read resources 1241 for processing a read command and write resources 1242 for processing a write command. The device resource 1240 may further include shared resources 1243 shared by the read command and the write command.

When determining that the peeked command is executable, the command preprocessing logic 1220 may fetch the peeked command and instruct the command processing logic 1230 to execute the fetched command. The command fetch logic 1210 may move the head pointer of the submission queue 125i to fetch the command from the submission queue. The command processing logic 1230 may allocate the device resources 1240 to the fetched command and execute the fetched command. In some embodiments, when determining that the peeked command is not executable, the command preprocessing logic 1220 may instruct the command fetch logic 1210 to push the inexecutable command back to the submission queue 125i. In some embodiments, the command fetch logic 1210 may manipulate the head pointer of the submission queue 125i to pack the inexecutable instructions in the submission queue 125i. Accordingly, an out of order command processing may be performed in the submission queue 125i.

In some embodiments, the command fetch logic 1210 may sequentially peek commands from a head to a tail of the submission queue 125i, and the command preprocessing logic 1220 may determine whether the peeked commands are executable. When determining that some commands are executable and other commands are not executable among the peeked commands, the command preprocessing logic 1220 may instruct the command processing logic 1230 to execute the executable commands, and may pack the inexecutable commands in the submission queue 125i. When the commands peeked from the submission queue 125i by the command fetching logic 1210 include read commands and write commands, and the read resources 1241 are available but the write resources 1242 are exhausted, the command processing logic 1230 may fetch and execute the read commands. The command fetch logic 1210 may move the head pointer of the submission queue 125i by the number of fetched read commands, and pack the write commands from a head entry indicated by the moved head pointer.

In some embodiments, when the submission queue 125i is formed in the host memory 112, the command fetch logic 1210 may request a write permission of the submission queue 125i from the host device, and may pack the commands in the submission queue 125i after receiving the write permission from the host device.

In some embodiments, the command preprocessing logic 1220 may mark the submission queue 125i in which the commands are packed as in a resource waiting state as described with reference to FIG. 3 to FIG. 7. In some embodiments, the command preprocessing logic 1220 may set information indicating a waiting resource for which the packed submission queue 125i waits. The information indicating the waiting resource may include, by way of a non-limiting example, at least one of a type of the waiting resource or an amount of the waiting resource.

As shown in FIG. 13, for example, it is assumed that write commands W0 and W1, a read command R0, a write commands W2, a read command R1, and a write command W3 are sequentially input to a submission queue SQ. Further, it is assumed that the write resources 1242 among the device resources 1240 are exhausted and are unavailable.

The command fetch logic 1210 may sequentially peek commands from the submission queue SQ, and fetch the read commands R0 and R1 since the read resources 1241 and the shared resources 1243 are available. The command processing logic 1230 may allocate resources to the fetched read commands R0 and R1 and execute the fetched read commands R0 and R1. Further, since the command fetch logic 1210 has fetched the two read commands R0 and R1, the command fetch logic 1210 may move a head pointer of the submission queue SQ from 'h' to 'h–2', and pack the write commands W0, W1, W2, and W3 again from an entry of the submission queue SQ indicated by the head pointer 'h–2'.

In some embodiments, the command preprocessing logic 1220 may monitor a status of the device resources 1240, and determine whether the resources for the submission queue SQ in which the commands have been packed again become available. When the resources become available, the command preprocessing logic 1220 may designate the submission queue SQ as an available submission queue. Accordingly, as described above, the operations of peeking a command from the submission queue SQ and determining whether the peeked command is executable may be performed. In some embodiments, when the resources become available, the command preprocessing logic 1220 may prioritize the submission queue SQ in which the commands have been packed again over other submission queues. For example, the command preprocessing logic 1220 may add the submission queue SQ in which the commands have been packed again to a head of the list of available submission queues.

In some embodiments, the command preprocessing logic 1220 may select a next target submission queue 125j from the submission queues 1251 to 125n, and may perform the operations of peeking a command from the selected submission queue 125j and determining whether the peeked command is executable.

Figure 14:
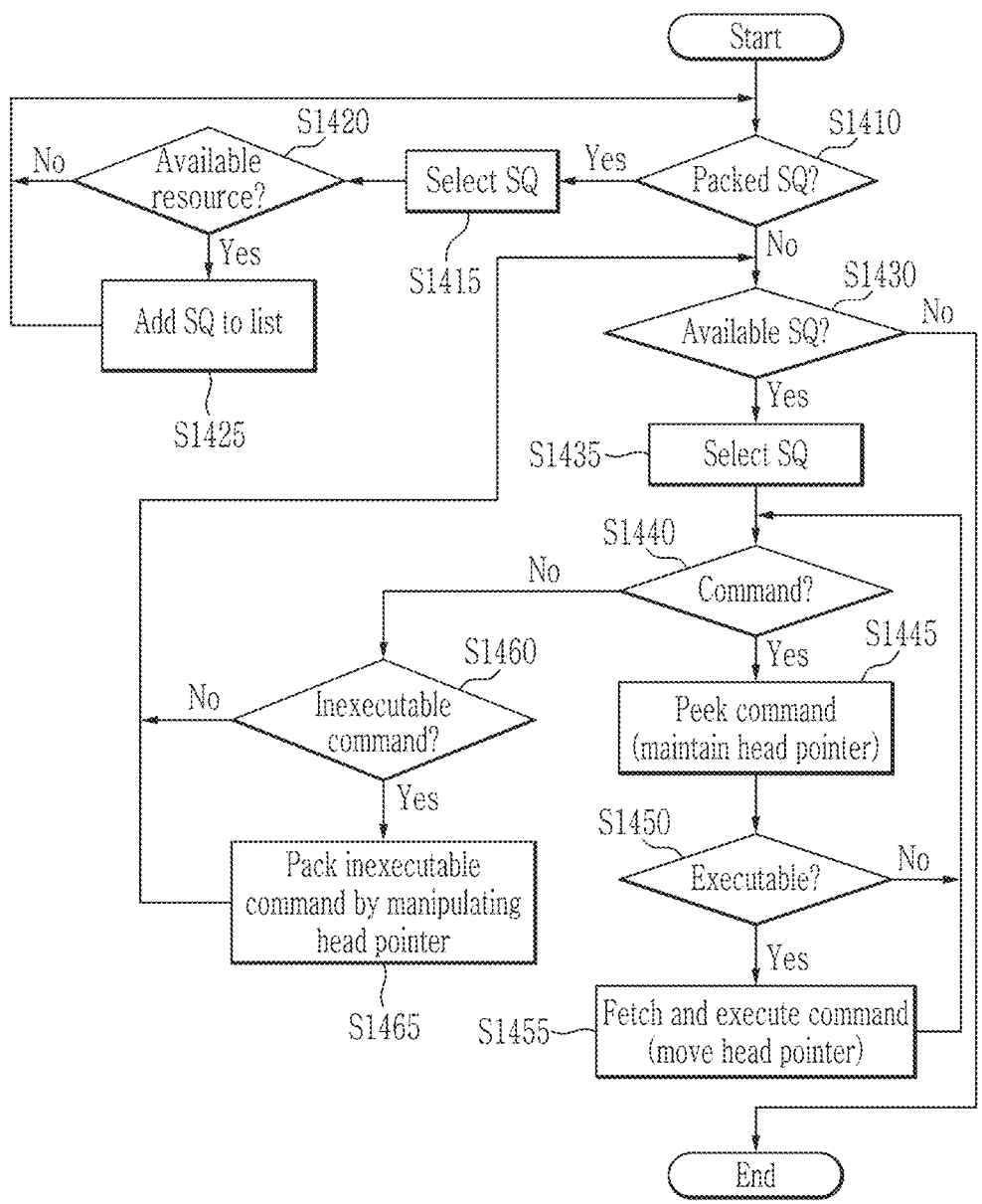
FIG. 14 is an exemplary flowchart showing an operation of a device controller in a storage device according to an embodiment.

FIG. 14 is an exemplary flowchart showing an operation of a device controller in a storage device according to an embodiment.

Referring to FIG. 14, when there is an available submission queue at S1430, a device controller may select a target submission queue from the available submission queues at S1435. When there is no available submission queue at S1430, the device controller may end an operation. When a command exists in the target submission queue at S1440, the device controller may peek the command from the target submission queue at S1445. The device controller may peek the command from the target submission queue and maintain a head pointer without moving it at S1445.

The device controller may determine whether the peeked command is executable based on information including a status of device resources at S1450. When the peeked command is not executable at S1450, the device controller may check again whether a next command exists in the target submission queue at S1440. When determining that the peeked command is executable at S1450, the device controller may fetch the command, and put the command in a command processing pipeline (or a command processing queue) to execute the command at S1455. Next, the device controller may check again whether a next command exists in the target submission queue at S1440.

After peeking the command up to the tail of the target submission queue at S1440, the device controller may check whether an inexecutable command exists in the target submission queue at S1460. If there is no inexecutable command, the device controller may select a next target submission queue from among the available submission queues at S1430 and S1435. If there is an inexecutable command, the device controller may pack the inexecutable command in the target submission queue at S1465. The device controller may move a head pointer of the target submission queue by the number of fetched commands, and pack the inexecutable command from a head entry indicated by the moved head pointer. In some embodiments, the device controller may mark the packed submission queue as in a resource waiting state. Next, the device controller may select a next target submission queue from among the available submission queues at S1430 and S1435, and repeat the operations described with reference to steps S1440 to S1465.

In some embodiments, in order to prioritize the packed submission queue, the device controller may check whether the packed submission queue exists at S1410. In some embodiments, the device controller may check whether a submission queue of the resource in the waiting state exists at S1410. If the packed submission queue does not exist at S1410, the device controller may select a submission queue from among the available submission queues at S1430 and S1435, and repeat the operations described with reference to S1440 to S1465.

When the packed submission queue exists at S1410, the device controller may select a submission queue from among the packed submission queues at S1415. The device controller may determine whether the selected submission queue is processable based on the state of the device resources at S1420. In some embodiments, the device controller may determine whether the selected submission queue is processable based on the status of the device resources and information indicating the resources for which the selected submission queue waits at S1420. For example, when the resources corresponding to a type and amount of the waiting resources are available in the device resources, the device controller may determine that the selected submission queue is processable.

When the selected submission queue is processable, the device controller may add the selected submission queue to a list of available submission queues at S1425. In some embodiments, the device controller may add the selected submission queue to a head of the list of available submission queues so that the selected submission queue can be selected first according to an arbitration mechanism. When the selected submission queue is not processable, the device controller may check whether another packed submission queue additionally exists at S1410, and repeat the operation described with reference to S1415 to S1425 or the operations described with reference to S1430 to S1465.

Figure 15:
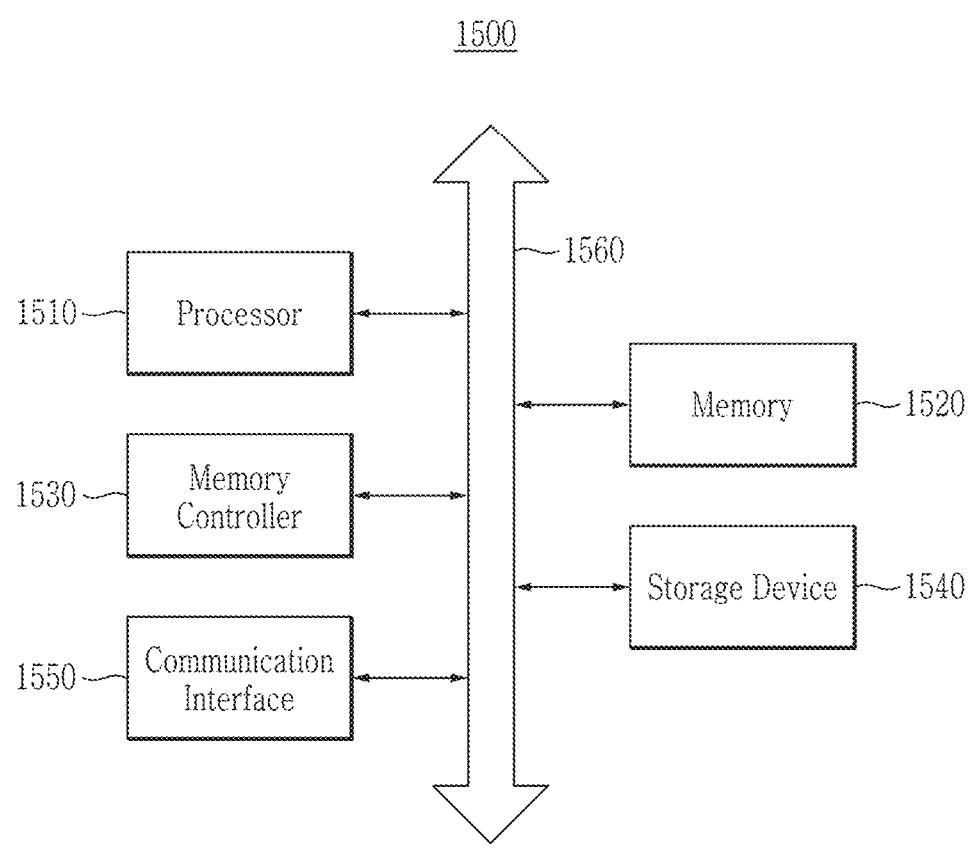
FIG. 15 is an exemplary block diagram of a computer device according to one embodiment.

FIG. 15 is an exemplary block diagram of a computer device according to one embodiment.

Referring to FIG. 15, a computing device 1500 may include a processor 1510, a memory 1520, a memory controller 1530, a storage device 1540, a communication interface 1550, and a bus 1560. The computing device 1500 may further include other general components.

The processor 1510 may control an overall operation of each component of the computing device 1500. The processor 1510 may be implemented with at least one of various processing units such as a central processing unit (CPU), an application processor (AP), and a graphic processing unit (GPU).

The memory 1520 may store various data and instructions. The memory controller 1530 may control transfers of the data or instructions to and from the memory 1520. In some embodiments, the memory controller 1530 may be provided as a separate chip from the processor 1510. In some embodiments, the memory controller 1530 may be provided as an internal component of the processor 1510.

The storage device 1540 may non-temporarily store programs and data. In some embodiments, the storage device 1540 may be implemented as the storage device described with reference to FIG. 1 to FIG. 14. The communication interface 1550 may support wired or wireless Internet communication of the computing device 1500. In addition, the communication interface 1550 may support various communication methods other than Internet communication. The bus 1560 may provide a communication function between the components of the computing device 1500. The bus 1560 may include at least one type of bus according to a communication protocol between the components.

In some embodiments, each logic or a combination of two or more logics described with reference to FIG. 1 to FIG. 14 may be implemented with a digital circuit, a programmable or non-programmable logic device or array, an application specific integrated circuit (ASIC), or the like.

While this invention has been described in connection with what is presently considered to be preferred embodiments, it is to be understood that the invention is not limited to the disclosed embodiments. On the contrary, it is intended to cover various modifications and equivalent arrangements included within the spirit and scope of the appended claims.

What is claimed is:

1. A device controller of a storage device including a non-volatile memory, comprising:
   device resources;
   a command fetch logic configured to peek a first command from a first submission queue from among a plurality of submission queues, and to fetch the first command from the first submission queue in response to determining that the first command is executable;
   a command preprocessing logic configured to determine whether the first command peeked by the command fetch logic is executable based on a status of the device resources; and
   a command processing logic configured to allocate the device resources to the first command fetched by the command fetch logic and execute the first command, in response to determining that the first command is executable,
   wherein the command fetch logic is configured to peek a second command from a second submission queue among the plurality of submission queues, and
   wherein the command preprocessing logic is configured to determine whether the second command is executable based on the status of the device resources, and to mark the second submission queue as in a waiting state of waiting for the device resources in response to determining that the second command is inexecutable.

2. The device controller of claim 1, wherein the command fetch logic is configured to not move a head pointer of the first submission queue at a time of peeking the first command, and to move the head pointer of the first submission queue at a time of fetching the first command.

3. The device controller of claim 1, wherein the command fetch logic is configured to drop the second command without fetching the second command in response to determining that the second command is inexecutable.

4. The device controller of claim 1, wherein the command preprocessing logic is configured to determine whether the second submission queue marked as in the waiting state is processable based on the status of the device resources, and
   wherein in response to determining that the second submission queue is processable, the command fetch logic is configured to peek the second command from the second submission queue, and the command preprocessing logic is configured to determine whether the second command is executable.

5. The device controller of claim 4, wherein the command preprocessing logic is configured determine that the second submission queue is processable when a resource for which the second command waits among the device resources is available.

6. The device controller of claim 5, wherein the command preprocessing logic is configured to prioritize the second submission queue marked as in the waiting state over remaining submission queues among the plurality of submission queues.

7. A device controller of a storage device including a non-volatile memory, comprising:
   device resources;
   a command fetch logic configured to peek a first command from a first submission queue from among a plurality of submission queues, and to fetch the first command from the first submission queue in response to determining that the first command is executable;
a command preprocessing logic configured to determine whether the first command peeked by the command fetch logic is executable based on a status of the device resources; and
a command processing logic configured to allocate the device resources to the first command fetched by the command fetch logic and execute the first command, in response to determining that the first command is executable,
a pending command queue,
wherein the command fetch logic is configured to peek the first command and a second command from the first submission queue, and
wherein in response to the command preprocessing logic determining that the first command is executable and the second command is inexecutable, the command fetch logic is configured to fetch the first command and the second command, and the command preprocessing logic is configured to store the second command in the pending command queue.

8. The device controller of claim 7, wherein the command preprocessing logic is configured to determine whether a third command stored in the pending command queue is executable based on the status of the device resources, and
wherein the command processing logic is configured to execute the third command in the pending command queue in response to determining that the third command in the pending command queue is executable.

9. The device controller of claim 8, wherein the command preprocessing logic is configured to prioritize the pending command queue over the plurality of submission queues.

10. A device controller of a storage device including a non-volatile memory, comprising:
device resources;
a command fetch logic configured to peek a first command from a first submission queue from among a plurality of submission queues, and to fetch the first command from the first submission queue in response to determining that the first command is executable;
a command preprocessing logic configured to determine whether the first command peeked by the command fetch logic is executable based on a status of the device resources; and
a command processing logic configured to allocate the device resources to the first command fetched by the command fetch logic and execute the first command, in response to determining that the first command is executable,
wherein the command fetch logic is configured to peek the first command and a second command from the first submission queue, and
wherein in response to the command preprocessing logic determining that the first command is executable and the second command is inexecutable, the command fetch logic is configured to fetch the first command from the first submission queue and pack the second command in the first submission queue.

11. The device controller of claim 10, wherein the command fetch logic is configured to move a head pointer of the first submission queue by a number of the first command, and pack the second command from an entry to which the head pointer is moved.

12. The device controller of claim 10, wherein the command preprocessing logic is configured to determine whether the first submission queue packed by the command fetch logic is processable based on the status of the device resources, wherein in response to determining that the first submission queue is processable, the command fetch logic is configured to peek the second command from the first submission queue, and the command preprocessing logic is configured to determine whether the second command is executable.

13. The device controller of claim 12, wherein the command preprocessing logic is configured to prioritize the first submission queue over remaining submission queues among the plurality of submission queues.

14. The device controller of claim 1, wherein the command preprocessing logic is configured to determine that the first command is executable and fetch the first command when a resource for executing the first command among the device resources is available.

15. The device controller of claim 14, wherein the device resources comprise read resources dedicated to a read command, write resources dedicated to a write command, and shared resources shared by the read command and the write command, and
wherein the command preprocessing logic is configured to determine that the resource for executing the first command is available and fetch the first command when a resource corresponding to an input/output type of the first command among the read resources and the write resources, and the shared resources are available.

16. The device controller of claim 14, wherein the device resources comprise a plurality of types of resources used to execute the first command, and
wherein the command preprocessing logic is configured to determine that the resource for executing the first command is unavailable when at least a portion among the plurality of types of resources is unavailable.

17. The device controller of claim 14, wherein the command preprocessing logic is configured to not allocate the device resources to the first command when the resource for executing the first command among the device resources is unavailable.

* * * * *